(12) United States Patent
Proietty et al.

(10) Patent No.: US 7,806,210 B2
(45) Date of Patent: Oct. 5, 2010

(54) CONGESTION-BASED CONTROL OF VEHICLE HYBRID PROPULSION SYSTEM

(75) Inventors: John Proietty, Ferndale, MI (US); Ming Kuang, Canton, MI (US); Greg Gauthier, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1006 days.

(21) Appl. No.: 11/462,315

(22) Filed: Aug. 3, 2006

(65) Prior Publication Data

US 2008/0029318 A1 Feb. 7, 2008

(51) Int. Cl.
*B60K 6/00* (2007.10)
(52) U.S. Cl. .................. 180/65.21; 180/65.28; 180/170
(58) Field of Classification Search .................. 180/170, 180/178, 179, 6.5, 65.25, 65.1, 65.26, 65.21, 180/65.28, 65.7; 701/112, 113
See application file for complete search history.

(56) References Cited

U.S. PATENT DOCUMENTS

| | | | |
|---|---|---|---|
| 4,372,262 A | | 2/1983 | Kaniut |
| 5,778,326 A | * | 7/1998 | Moroto et al. ................ 701/22 |
| 5,899,953 A | * | 5/1999 | Urahashi .................... 701/117 |
| 6,044,321 A | * | 3/2000 | Nakamura et al. ............ 701/96 |
| 6,190,282 B1 | | 2/2001 | Deguchi et al. |
| 6,209,672 B1 | | 4/2001 | Severinsky |
| 6,223,118 B1 | * | 4/2001 | Kobayashi et al. ............ 701/96 |
| 6,283,086 B1 | * | 9/2001 | Yamamoto et al. ...... 123/198 D |
| 6,381,522 B1 | | 4/2002 | Watanabe et al. |
| 6,463,896 B1 | * | 10/2002 | Fujiwara et al. .......... 123/90.11 |
| 6,487,477 B1 | | 11/2002 | Woestman et al. |
| 6,526,931 B1 | * | 3/2003 | Vilou ....................... 123/179.4 |
| 6,561,295 B1 | * | 5/2003 | Kuroda et al. ............ 180/65.25 |
| 6,687,581 B2 | | 2/2004 | Deguchi et al. |
| 6,688,120 B2 | * | 2/2004 | Aoki et al. .................... 62/133 |
| 7,099,768 B2 | * | 8/2006 | Moriya ........................ 701/112 |
| 7,131,510 B2 | * | 11/2006 | Mesiti et al. ............. 180/65.25 |
| 7,404,784 B2 | * | 7/2008 | De Mersseman ............. 477/97 |
| 2003/0029406 A1 | * | 2/2003 | Weiss ....................... 123/179.4 |
| 2005/0228553 A1 | * | 10/2005 | Tryon .......................... 701/22 |
| 2007/0208493 A1 | * | 9/2007 | Downs et al. ............... 701/117 |

FOREIGN PATENT DOCUMENTS

| | | |
|---|---|---|
| JP | 8168105 | 6/1996 |
| JP | 10178704 | 6/1998 |

\* cited by examiner

*Primary Examiner*—Paul N Dickson
*Assistant Examiner*—Bridget Avery
(74) *Attorney, Agent, or Firm*—David B. Kelley; Alleman Hall McCoy Russell & Tuttle LLP

(57) ABSTRACT

A method of controlling a hybrid propulsion system of a vehicle, the hybrid propulsion system including an internal combustion engine and an alternate powertrain torque source capable of propelling the vehicle while the engine is turned off, the method comprising of detecting congestion by receiving and analyzing data that is external to the vehicle, and controlling a transition of the hybrid propulsion system between a first propulsion mode and a second propulsion mode based on said detecting of congestion.

24 Claims, 5 Drawing Sheets

CONGESTION-BASED CONTROL OF VEHICLE HYBRID PROPULSION SYSTEM

BACKGROUND AND SUMMARY

Research and commercialization of vehicles with hybrid propulsion systems has increased substantially in recent years. Hybrid-electric vehicles (HEV) in particular have been successfully introduced into the marketplace, and are expected to capture substantial increases in market share in coming years. HEV vehicles may be configured in a variety of ways. Typical configurations include a battery or other energy storage device, and a motor/generator or other mechanism for converting mechanical energy of the vehicle into electrical energy stored in the battery, and/or for using the electrical energy stored in the battery to generate torque for propelling the vehicle.

HEV vehicles typically are capable of operating in different propulsion modes. For example, some HEV vehicles may be operated with the internal combustion engine turned on or turned off. In these vehicles, various control schemes are employed to control whether the engine is turned on or off.

The inventors herein have recognized that such vehicles commonly suffer from problems associated with sub-optimal control of the available propulsion modes. In particular, many HEV systems suffer performance deficits when operated in conditions that tend to produce frequent propulsion mode transitions. Propulsion mode transitions have a "cost" in the sense that there are often control complexities, temporary inefficiencies, NVH issues, etc. with making a transition. The desirability of a contemplated transition is therefore somewhat dependent upon the amount of time that will likely be spent in the new mode.

In one approach, the above issues may be addressed by a method of controlling a hybrid propulsion system of a vehicle, the hybrid propulsion system including an internal combustion engine and an alternate powertrain torque source capable of propelling the vehicle while the engine is turned off, the method comprising of detecting congestion by receiving and analyzing data that is external to the vehicle, and controlling a transition of the hybrid propulsion system between a first propulsion mode and a second propulsion mode based on said detecting of congestion.

DETAILED DESCRIPTION OF THE DRAWINGS

DETAILED DESCRIPTION

Figure 1:
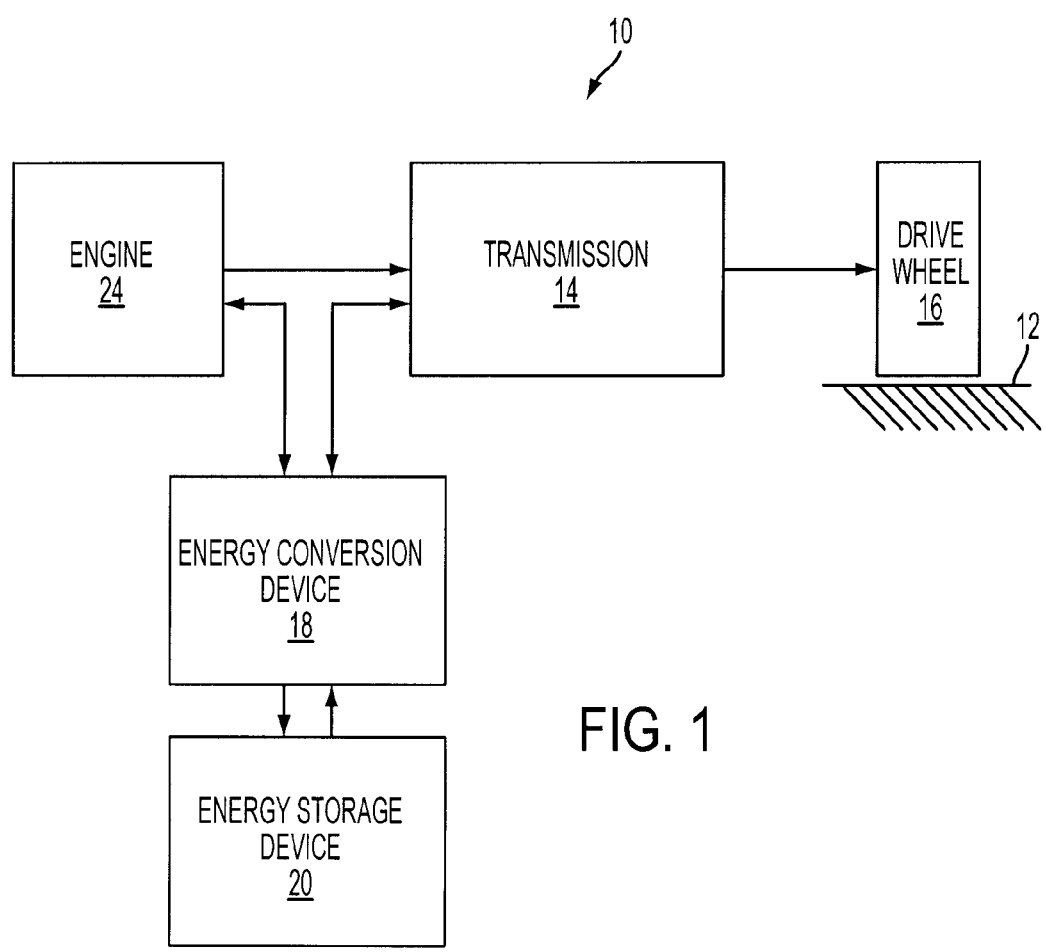
FIG. 1 is a schematic of a vehicle according to the present description.

Referring to FIG. 1, the figure schematically depicts a vehicle with a hybrid propulsion system 10. Hybrid propulsion system 10 includes an internal combustion engine 24, further described herein with particular reference to FIG. 2, coupled to transmission 14. Transmission 14 may be a manual transmission, automatic transmission, or combinations thereof. Further, various additional components may be included, such as a torque converter, and/or other gears such as a final drive unit, etc. Transmission 14 is shown coupled to drive wheel 16, which in turn is in contact with road surface 12.

In this example embodiment, the hybrid propulsion system also includes an energy conversion device 18, which may include a motor, a generator, among others and combinations thereof. The energy conversion device 18 is further shown coupled to an energy storage device 20, which may include a battery, a capacitor, a flywheel, a pressure vessel, etc. The energy conversion device can be operated to absorb energy from vehicle motion and/or the engine and convert the absorbed energy to an energy form suitable for storage by the energy storage device (i.e. provide a generator operation). The energy conversion device can also be operated to supply an output (power, work, torque, speed, etc.) to the drive wheels 16 and/or engine 24 (i.e. provide a motor operation). It should be appreciated that the energy conversion device may, in some embodiments, include only a motor, only a generator, or both a motor and generator, among various other components used for providing the appropriate conversion of energy between the energy storage device and the vehicle drive wheels and/or engine.

The depicted connections between engine 24, energy conversion device 18, transmission 14, and drive wheel 16 indicate transmission of mechanical energy from one component to another, whereas the connections between the energy conversion device and the energy storage device may indicate transmission of a variety of energy forms such as electrical, mechanical, etc. For example, torque may be transmitted from engine 24 to drive the vehicle drive wheels 16 via transmission 14. As described above energy storage device 18 may be configured to operate in a generator mode and/or a motor mode. In a generator mode, system 18 absorbs some or all of the output from engine 24 and/or transmission 14, which reduces the amount of drive output delivered to the drive wheel 16, or the amount of braking torque to the drive wheel 16. Such operation may be employed, for example, to achieve efficiency gains through regenerative braking, improved engine efficiency, etc. Further, the output received by the energy conversion device may be used to charge energy storage device 20. In motor mode, the energy conversion device may supply mechanical output to engine 24 and/or transmission 14, for example by using electrical energy stored in an electric battery.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller as will be describe below with reference to FIG. 2.

From the above, it should be understood that the exemplary hybrid propulsion system is capable of various modes of operation. In a full hybrid implementation, for example, the propulsion system may operate using energy conversion device 18 (e.g., an electric motor) as the only torque source propelling the vehicle. This "electric only" mode of operation may be employed during braking, low speeds, while stopped at traffic lights, etc. In another mode, engine 24 is turned on, and acts as the only torque source powering drive wheel 16. In still another mode, which may be referred to as an "assist" mode, the alternate torque source 18 may supplement and act in cooperation with the torque provided by engine 24. As indicated above, energy conversion device 18 may also operate in a generator mode, in which torque is absorbed from engine 24 and/or transmission 14. Furthermore, energy conversion device 18 may act to augment or absorb torque during transitions of engine 24 between different combustion modes (e.g., during transitions between a spark ignition mode and a compression ignition mode).

Figure 2:
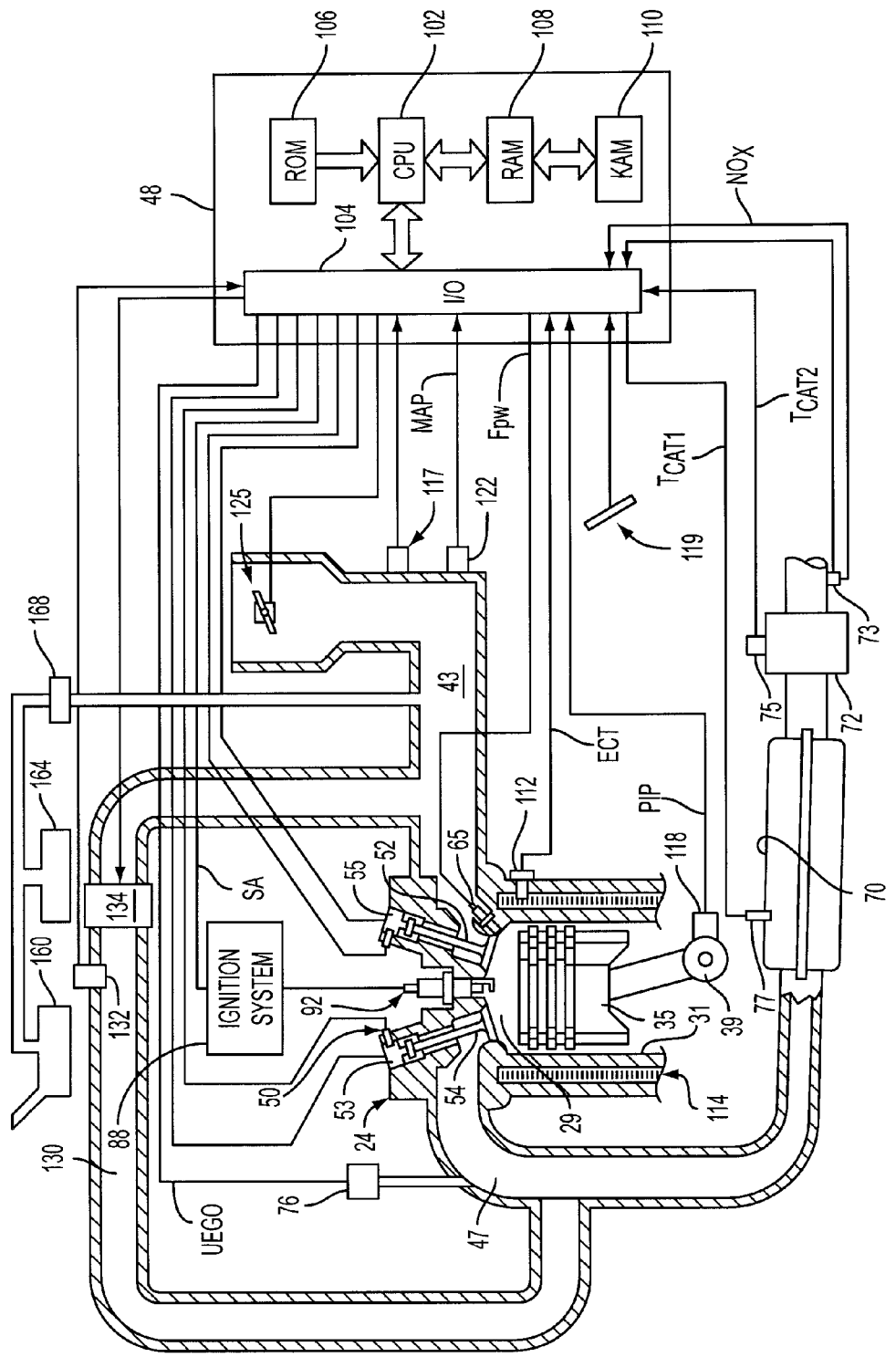
FIG. 2 is a schematic depiction of an internal combustion engine.

FIG. 2 shows one cylinder of a multi-cylinder engine, as well as the intake and exhaust path connected to that cylinder. Internal combustion engine 24 is shown in FIG. 2 as a direct injection gasoline engine with a spark plug; however, engine 24 may utilize port injection exclusively or in conjunction with direct injection. In an alternative embodiment, a port fuel injection configuration may be used where a fuel injector is coupled to intake manifold 43 in a port, rather than directly to combustion chamber 29.

Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves. FIG. 2 merely shows one cylinder of a multi-cylinder engine, and that each cylinder has its own set of intake/exhaust valves, fuel injectors, spark plugs, etc.

In some embodiments, intake valve 52 and exhaust valve 54 may be controlled by electric valve actuators (EVA) 55 and 53, respectively. Alternatively, variable cam timing (VCT) may be used to adjust valve timing. Valve position sensors 50 may be used to determine the position of the valves.

In some embodiments, combustion cylinder 29 can be deactivated by at least stopping the supply of fuel supplied to combustion cylinder 29 for at least one cycle. During deactivation of combustion cylinder 29, one or more of the intake and exhaust valves can be adjusted to control the amount of air passing through the cylinder. In this manner, engine 24 can be configured to deactivate one, some or all of the combustion cylinders, thereby enabling variable displacement engine (VDE) operation.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of combustion by autoignition.

Engine 24 is also shown having fuel injector 65 coupled thereto for delivering liquid fuel in proportion to the pulse width of signal FPW from controller 48 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. Exhaust gas sensor 76 is shown coupled to exhaust manifold 48 upstream of catalytic converter 70. The signal from sensor 76 can be used to advantage during feedback air/fuel control in a conventional manner to maintain average air/fuel at stoichiometry during the stoichiometric homogeneous mode of operation.

FIG. 2 further shows engine 24 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or $O_2$ in the exhaust gas.

In some embodiments, the engine may include a fuel vapor purging system for purging fuel vapors to the combustion chamber. As one example, fuel vapors originating in fuel tank 160 may be stored in fuel vapor storage tank 164 until they are purged to intake passage 43 via fuel purge valve 168. The position of the fuel vapor purge valve may be varied by the control system to provide fuel vapors to the combustion chamber during select operating conditions.

Controller 48 is shown in FIG. 2 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

In some embodiments, controller 48 can be configured to control operation of the various systems described above with reference to FIG. 1. For example, the energy storage device may be configured with a sensor that communicates with controller 48, thereby enabling a determination to be made of the state of charge or quantity of energy stored by the energy storage device. In another example, controller 48 or other controller can be used to vary a condition of the energy conversion device and/or transmission. Further, in some embodiments, controller 48 may be configured to cause combustion chamber 29 to operate in various combustion modes, as described herein. The fuel injection timing may be varied to provide different combustion modes, along with other parameters, such as EGR, valve timing, valve operation, valve deactivation, etc.

Combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled autoignition (CAI), where autoignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that autoignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach autoignition conditions at or near the end of the compression stroke. It will be appreciated by those skilled in the art that numerous other methods may be used to elevate initial charge temperature. Some of these include: heating the intake air (heat exchanger), keeping part of the warm combustion products in the cylinder (internal EGR) by adjusting intake and/or exhaust valve timing, compressing the inlet charge (turbo-charging and supercharging), changing the autoignition characteristics of the fuel provided to the engine, and heating the intake air charge (external EGR).

During HCCI combustion, autoignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

Note that a plurality of other parameters may affect both the peak combustion temperature and the required temperature for efficient HCCI combustion. These and any other applicable parameters may be accounted for in the routines embedded in engine controller 48 and may be used to determine optimum operating conditions. For example, as the octane rating of the fuel increases, the required peak compression temperature may increase as the fuel requires a higher peak compression temperature to achieve ignition.

Also, the level of charge dilution may be affected by a variety of factors including both humidity and the amount of exhaust gases present in the intake charge. In this way, it is possible to adjust engine parameters to compensate for the effect of humidity variation on autoignition, i.e., the effect of water makes autoignition less likely.

In one particular example, autoignition operation and combustion timing may be controlled by varying intake and/or exhaust valve timing and/or lift to, for example, adjust the amount of residual trapped gasses. Operating an engine in HCCI using the gas trapping method can provide fuel-efficient combustion with extremely low engine out NOx emissions.

However, the achievable HCCI window of operation for low engine speed and/or low engine load may be limited. That is, if the temperature of the trapped gas is too low, then HCCI combustion may not be possible at the next combustion event. If it is necessary to switch out of HCCI and into spark ignition mode during low load in which temperatures may fall too low, and then to return back into HCCI operation once conditions are acceptable, there may be penalties in engine emissions and fuel economy and possible torque/NVH disruption to the driver during each transition. Therefore, in one embodiment, a method that enables additional operation in HCCI or other limited combustion mode at high or low speeds and loads is described herein utilizing an alternative torque source, such as an energy conversion device/generator. Furthermore, extending the low load limit of HCCI operation, for one or more cycles, to obtain increased benefit from HCCI operation may be desirable.

While one or more of the above combustion modes may be used in some examples, still other combustion modes may be used, such as stratified operation, either with or without spark initiated combustion.

As discussed above, hybrid propulsion system 10 may be operated in a variety of different modes. Various inputs may be used to select from among the different modes, and/or to control operation of the hybrid propulsion system while operating in a given mode. Example inputs include engine speed, vehicle speed, requested torque, catalyst temperature, manifold pressure, air/fuel ratio, catalyst temperature and/or status of aftertreatment systems, throttle position, accelerator pedal position, requested power, adaptively-learned drive behavior, operating temperature conditions, humidity, etc., status of climate controls, PIP, state of charge (SOC) in hybrid-electric vehicle, etc.

Figure 3:
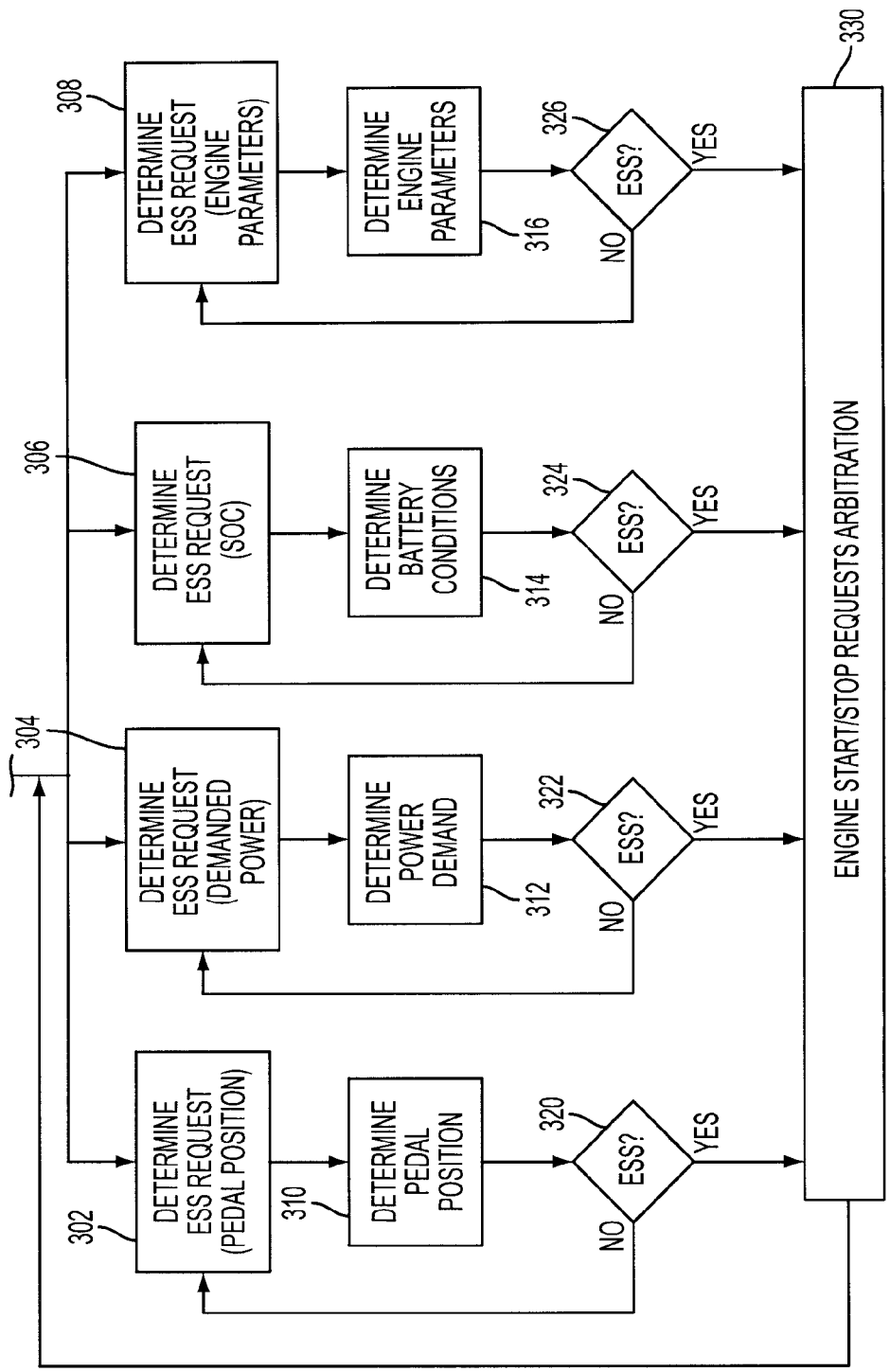
FIGS. 3-6 are exemplary methods for controlling the hybrid propulsion system depicted in FIGS. 1 and 2.

In many cases, the various inputs are used to select and/or initiate transitions between propulsion modes in which the internal combustion engine is turned on and propulsion modes in which the engine is turned off. For example, as shown in FIG. 3, various inputs may be used in determining when to generate a command (e.g., to electronic engine controller 48) to start or stop engine 24. Such a command will at times be referred to herein as an engine start/stop (ESS) request.

Referring to the exemplary method of FIG. 3, the method includes determining the conditions under which an ESS request will be issued. At 302, the method includes determining what pedal position (e.g., of the accelerator pedal) will trigger an ESS request. At 304, the method includes determining what level of requested power will trigger an ESS request. At 306 and 308, respectively, similar determinations are made for state of charge (e.g., amount of energy stored in energy storage device 20) and other operating parameters. Typically, the thresholds established for the different inputs will vary according to other parameters. For example, the specific triggering threshold for pedal position may vary with engine speed, state of charge, operating temperature conditions, status of climate control systems, etc.

At 310, 312, 314 and 316, respectively, the relevant parameters or inputs are sensed or inferred. At 310, for example, the pedal position is determined (e.g., by receiving data from sensor 119 at controller 48). Demanded or requested power is sensed/inferred at 312; battery conditions are sensed/inferred at 314; other parameters are sensed/inferred at 316. It should be understood that the method of FIG. 3 is exemplary only, and that engine start/stop requests may be correlated with a variety of other inputs or combinations of inputs.

At 320, 322, 324 and 326, the obtained values are compared against the thresholds established at 302, 304, 306 and 308 to determine whether an ESS request(s) is to be issued. In each case, the exemplary method may be such that processing flow returns to 302, 304, 306, 308, where triggering thresholds are adjusted or re-established.

At 330, the exemplary method may include arbitration of ESS requests. Arbitration may include assessment of other factors or operating conditions. For example, assessment of pedal position (e.g., at 310) or requested power (e.g., at 312) may result in a request that the engine be turned off in order to improve fuel efficiency. However, the state of charge (e.g., of energy storage device 20) may dictate that the ESS request be denied or postponed, to allow continued operation in generator mode and recharging of the energy storage device.

From the above, it will be appreciated that various control routines may be employed to enable transitions between different propulsion modes as desired, and/or to control or vary operation during a given propulsion mode. Such transitions may occur at any desired time during operation. Indeed, control may be implemented, for example, to effect frequent and repeated transitions between modes where the engine is running and modes where the engine is turned off.

Nonetheless, it will at times be desirable to avoid engine start and/or shutoff events, and/or limit the frequency of those events. Starting and stopping the engine can, in some settings, produce a noticeable "shudder" or vibration of the vehicle. Thus, from a noise, vibration and harshness (NVH) perspective, it will often be desirable to avoid frequent transitions between propulsion modes. Also, cabin noise can vary significantly between propulsion modes, and frequent propulsion mode transitions can be distracting to the vehicle occupants. Furthermore, propulsion mode transitions can cause short term increases in emissions, and other adverse (though usually short-term) performance/efficiency effects.

Various situations and operating conditions lead to frequent requests (e.g., by controller 48) to transition between propulsion modes. For example, in stop-and-go driving, such as in congested city traffic or on a freeway during rush hour, inputs received from the vehicle operator can cause the engine controller to frequently request/initiate propulsion mode transitions. Often, these transitions do not produce the desired improvements in fuel economy, because the propulsion system is quickly returned to the prior propulsion mode. Accordingly, the potential benefit of the new requested propulsion mode is outweighed by the short term control issues and performance deficits associated with making transitions from the new mode and then back to the prior mode. For example, during stop-and-go traffic on a freeway, a driver may tip in, thereby causing an engine start, only to have the engine be turned off a few seconds later as traffic slows or comes to a stop.

Figure 4:
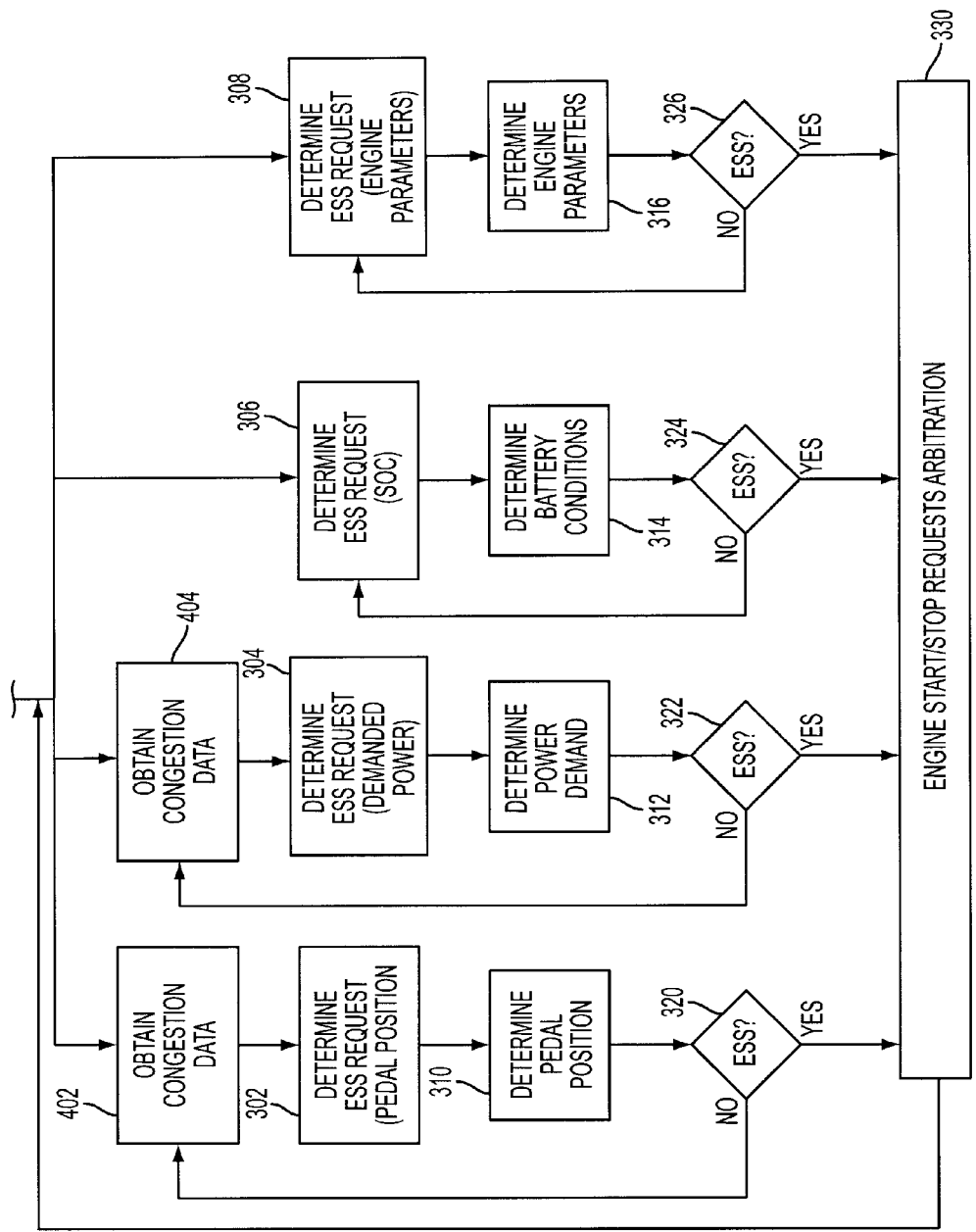

Accordingly, as will be explained with reference to FIGS. 4-6, the exemplary hybrid propulsion system and method may be configured to detect conditions in which the benefits of switching to a new propulsion mode may be outweighed by the transition costs. Referring first to FIG. 4, at 402 and 404, the exemplary method includes obtaining congestion data. The obtained congestion data is used in determining the pedal position and/or requested power level that will trigger an ESS request at 302 and/or 304. The congestion data may simply indicate the presence or absence of congestion, or may sense an amount or level of congestion. The modulation of the ESS requests may be implemented in a variety of ways. For example, if congestion is detected, the pedal position ESS trigger may be modified so that the pedal must be depressed further to initiate an ESS request. Alternatively, the pedal position trigger may be disabled entirely, such that ESS start requests are independent of pedal position. In still another example, the pedal position triggering setpoint is established based on a level of detected congestion, instead of simply the presence or absence of congestion.

Similarly, at 304, the requested power that will trigger an ESS request may be varied dependent upon the obtained congestion data. In the presence of congestion, the requested power level to trigger an ESS request may be increased, and/or requested power triggers may be disabled completely during periods of congestion, or when congestion is indicated as being particularly high. These are but examples; the correlation between congestion and ESS requests triggered by pedal position and/or requested power may be implemented in many different ways. In addition, it should be understood that the method of FIG. 4 and the other methods discussed herein may be performed in a variety of different sequences, with various steps being added, omitted, and/or performed in a different order than that depicted in the figures. For example, referring to 402 and 302, and 404 and 304, the method of FIG. 4 may be implemented so that ESS requests are determined or established prior to obtaining congestion data, or in parallel with the acquisition of the congestion data.

Figure 5:
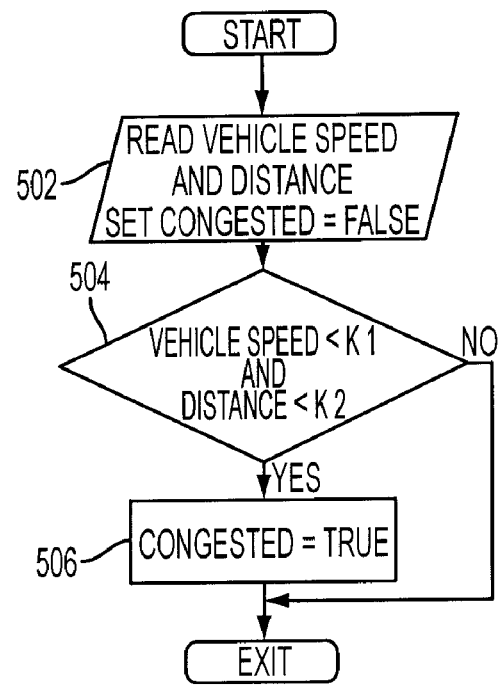
Figure 6:
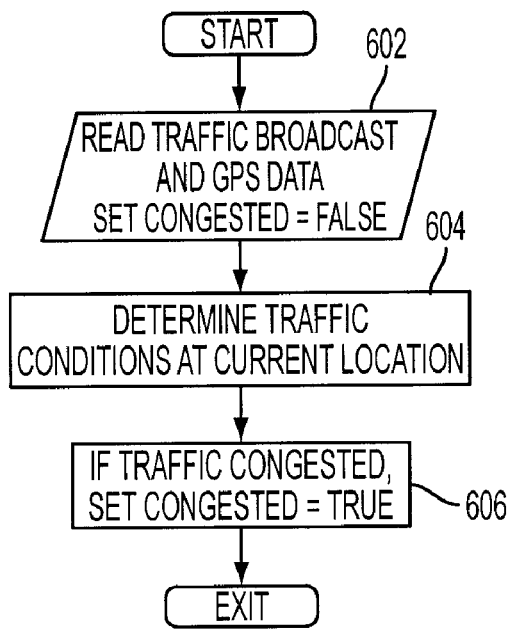

Turning now to FIGS. 5 and 6, congestion data may be obtained in a variety of ways. Referring first to FIG. 5, congestion data may be determined based on vehicle speed and distance to nearby moving objects (e.g., other vehicles). At 502, the exemplary method includes setting congested=FALSE and reading vehicle speed and distance to a nearby object. Then, at 504, it is determined whether vehicle speed is less than a predetermined value K1 and distance to the nearby object is less than another predetermined value K2. If these conditions are both satisfied, congestion is established and congestion is set to TRUE at 506.

Referring now to FIG. 6, congestion data may also be obtained via broadcast or other external communication, such as with a global positioning system (GPS) or via a received radio broadcast. At 602, the exemplary method includes setting congested to FALSE and receiving traffic broadcast data and/or GPS data. At 604, based on the received data, the traffic conditions are determined for the current location of the vehicle. At 606, congested is set to TRUE if the traffic conditions are congested at the present location.

Note that the example control and estimation routines included herein can be used with various engine and/or hybrid propulsion system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48.

It will be appreciated that the configurations and routines disclosed herein are exemplary in nature, and that these specific embodiments are not to be considered in a limiting sense, because numerous variations are possible. For example, the above technology can be applied to V-4, V-6, V-8, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of controlling a hybrid propulsion system of a vehicle, the hybrid propulsion system including an internal combustion engine and an alternate powertrain torque source capable of propelling the vehicle while the engine is turned off, the method comprising:
   operating the hybrid propulsion system with the engine turned off during a first level of congestion;
   during the first level of congestion, generating an engine start request upon at least one of (1) an accelerator pedal exceeding a threshold position, and (2) a driver power demand exceeding a threshold;
   detecting a change in congestion to a second level of congestion; and
   modifying the threshold respective in response to detecting the second level of congestion and, while the engine is turned off during the second level of congestion, generating an engine start request upon the exceeding of such modified threshold.

2. The method of claim 1, further comprising detecting congestion by receiving and analyzing data that is external to the vehicle.

3. The method of claim 1, where the second level of congestion is higher than the first level of congestion.

4. The method of claim 1, further comprising controlling transitions of the hybrid propulsion system based on detecting of congestion.

5. The method of claim 2, where receiving and analyzing data that is external to the vehicle includes receiving sensor data indicative of a distance between the vehicle and another vehicle.

6. The method of claim 2, where receiving and analyzing data which is external to the vehicle includes receiving data via a global positioning system.

7. The method of claim 3, where modifying the threshold includes increasing an amount of accelerator pedal depression required to generate the engine start request during the second level of congestion.

8. The method of claim 3, where modifying the threshold includes increasing an amount of requested power required to generate the engine start request during the second level of congestion.

9. A method of controlling a hybrid propulsion system of a vehicle, the hybrid propulsion system including an internal combustion engine and an alternate powertrain torque source capable of propelling the vehicle while the engine is turned off, the method comprising:
   detecting congestion by receiving and analyzing data that is external to the vehicle; and
   controlling a transition of the hybrid propulsion system between a first propulsion mode and a second propulsion mode based on said detecting of congestion, wherein controlling of the transition includes modifying generation of an engine start request based on said detecting of congestion, such that at a first level of congestion, the engine start request is generated upon an operating parameter exceeding a first value, and at a second, higher, level of congestion, the engine start request is generated upon the operating parameter exceeding a second value which is different than the first value.

10. The method of claim 9, where the internal combustion engine is turned on in the first propulsion mode and turned off in the second propulsion mode.

11. The method of claim 9, where the operating parameter is a position of an accelerator pedal of the vehicle.

12. The method of claim 9, where the operating parameter is a driver power demand.

13. The method of claim 9, where modifying generation of the engine start request based on said detecting of congestion includes requiring that a driver power demand be higher to generate the engine start request when the second, higher, level of congestion is detected than when the first level of congestion is detected.

14. The method of claim 9, where receiving and analyzing data which is external to the vehicle includes receiving sensor data indicative of a distance between the vehicle and another vehicle.

15. The method of claim 9, where receiving and analyzing data which is external to the vehicle includes receiving data via a global positioning system.

16. The method of claim 11, where modifying generation of the engine start request based on said detecting of congestion includes requiring the accelerator pedal to be depressed further to generate the engine start request when the second, higher, level of congestion is detected than when the first level of congestion is detected.

17. A vehicle, comprising:
   a hybrid propulsion system having an internal combustion engine and an alternate powertrain torque source capable of propelling the vehicle while the internal combustion engine is turned off; and
   an electronic engine controller configured to:
   receive external data indicative of congestion; and
   control a transition of the hybrid propulsion system from a first propulsion mode to a second propulsion mode based on said external data, said control modifying generation of an engine start request based on detection of congestion, such that at a first level of congestion, the engine start request is generated upon an operating parameter exceeding a first value, and at a second, higher, level of congestion, the engine start request is generated upon the operating parameter exceeding a second value which is different than the first value.

18. The vehicle of claim 17, where the internal combustion engine is turned on in the first propulsion mode and turned off in the second propulsion mode.

19. The vehicle of claim 17, where the operating parameter is a position of an accelerator pedal of the vehicle.

20. The vehicle of claim 17, where the operating parameter is a driver power demand.

21. The vehicle of claim 17, further comprising a sensor configured to obtain the external data, said external data being indicative of a distance between the vehicle and another vehicle.

22. The vehicle of claim 17, further comprising a receiver configured to receive GPS data and thereby generate the external data.

23. The vehicle of claim 19, where the electronic engine controller is configured to modify the engine start request by requiring the accelerator pedal to be depressed further to generate the engine start request when the second, higher, level of congestion is detected than when the first level of congestion is detected.

24. The vehicle of claim 20, where the electronic engine controller is configured to modify the engine start request by requiring that the driver power demand be higher to generate the engine start request when the second, higher, level of congestion is detected than when the first level of congestion is detected.

* * * * *